United States Patent
Lemoine

(10) Patent No.: US 12,071,368 B2
(45) Date of Patent: Aug. 27, 2024

(54) GLAZING UNIT WITH FREQUENCY SELECTIVE COATING AND METHOD

(71) Applicants: AGC GLASS EUROPE, Louvain-la-neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(72) Inventor: Adrien Lemoine, Court-Saint-Etienne (BE)

(73) Assignees: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 165 days.

(21) Appl. No.: 17/601,804

(22) PCT Filed: Apr. 30, 2020

(86) PCT No.: PCT/EP2020/062006
§ 371 (c)(1),
(2) Date: Oct. 6, 2021

(87) PCT Pub. No.: WO2020/221851
PCT Pub. Date: Nov. 5, 2020

(65) Prior Publication Data
US 2022/0177363 A1 Jun. 9, 2022

(30) Foreign Application Priority Data
Apr. 30, 2019 (EP) .................................. 19171985

(51) Int. Cl.
*C03C 17/36* (2006.01)
*B23K 26/362* (2014.01)
(Continued)

(52) U.S. Cl.
CPC .......... *C03C 17/366* (2013.01); *B23K 26/362* (2013.01); *B23K 26/402* (2013.01);
(Continued)

(58) Field of Classification Search
CPC .......... H01Q 15/0013; B32B 17/10174; B32B 17/10183; B32B 17/10192;
(Continued)

(56) References Cited

U.S. PATENT DOCUMENTS 5,364,685 A * 11/1994 Nakashima ....... B32B 17/10376
428/209
8,927,069 B1 1/2015 Estinto et al.
(Continued)

FOREIGN PATENT DOCUMENTS

CN 108162728 A * 6/2018 ................ B60J 1/02
DE 10 2011 115 967 A1 4/2013
(Continued)

OTHER PUBLICATIONS

Machine translation of DE 102011/115967 A, obtained from EspaceNet.*
(Continued)

*Primary Examiner* — Z. Jim Yang
(74) *Attorney, Agent, or Firm* — Oblon, McClelland, Maier & Neustadt, L.L.P.

(57) ABSTRACT

An improved glazing unit including a glass panel which is low in reflectance for RF radiation, a coating system which is high in reflectance for RF radiation disposed on the glass panel and creating onto the glazing unit a dual band bandpass filter. The glazing unit further includes at least one
(Continued)

frequencies selective decoated portion of the coating system extending along a plane, P; having a width, DW, and a length, DL. The at least one frequencies selective decoated portion features a first decoated element with a plurality of unit cells, and a plurality of second decoated elements where a second decoated element is placed in a unit cell of the first decoated element, but no second decoated element is in contact with the first decoated element and at least one unit cell of the first decoated element has no second decoated element.

15 Claims, 10 Drawing Sheets

(51) Int. Cl.
*B23K 26/402* (2014.01)
*B23K 101/34* (2006.01)
*B23K 103/00* (2006.01)

(52) U.S. Cl.
CPC ...... *C03C 17/3644* (2013.01); *C03C 17/3649* (2013.01); *B23K 2101/34* (2018.08); *B23K 2103/54* (2018.08); *C03C 2217/231* (2013.01); *C03C 2217/252* (2013.01); *C03C 2217/253* (2013.01); *C03C 2217/256* (2013.01); *C03C 2217/948* (2013.01); *C03C 2218/328* (2013.01)

(58) Field of Classification Search
CPC ......... B32B 17/1022; B32B 17/10229; C03C 17/366; C03C 17/3644; C03C 17/3647; C03C 17/3681; G02B 5/204; G02B 5/208; G02B 5/281; G02B 5/282; G02B 5/284; G02B 5/285
See application file for complete search history.

(56) References Cited

U.S. PATENT DOCUMENTS

| | | | | |
|---|---|---|---|---|
| 2003/0034926 | A1* | 2/2003 | Veerasamy | H01Q 1/36 343/711 |
| 2004/0107641 | A1* | 6/2004 | Walton | E06B 7/28 49/50 |
| 2004/0200821 | A1 | 10/2004 | Voeltzel | |
| 2006/0267856 | A1 | 11/2006 | Voeltzel | |
| 2009/0027300 | A1* | 1/2009 | Kudo | H05K 9/0094 343/912 |
| 2009/0140938 | A1* | 6/2009 | Ishibashi | H01Q 1/44 343/897 |
| 2013/0295300 | A1 | 11/2013 | Paulus | |
| 2015/0093466 | A1 | 4/2015 | Estinto et al. | |
| 2015/0093554 | A1 | 4/2015 | Estinto et al. | |
| 2015/0202719 | A1* | 7/2015 | Wohlfeil | B23K 26/0006 428/209 |
| 2015/0343884 | A1* | 12/2015 | Rousselet | B60J 1/002 359/360 |
| 2016/0009592 | A1* | 1/2016 | Arslan | B23K 26/364 428/209 |
| 2016/0286609 | A1* | 9/2016 | Paulus | H01Q 15/0013 |
| 2016/0374150 | A1* | 12/2016 | Guillaume | B32B 17/10174 |
| 2018/0036839 | A1 | 2/2018 | Estinto et al. | |
| 2018/0090825 | A1* | 3/2018 | Jiang | H04M 1/0283 |
| 2018/0111448 | A1 | 4/2018 | Rousselet et al. | |
| 2018/0159241 | A1* | 6/2018 | Niembro | C03C 17/23 |
| 2018/0316365 | A1* | 11/2018 | Völkel | H01Q 15/0013 |
| 2018/0342789 | A1* | 11/2018 | Jiang | H01Q 1/528 |
| 2021/0129495 | A1* | 5/2021 | Asai | B32B 17/10761 |

FOREIGN PATENT DOCUMENTS

| | | | | | |
|---|---|---|---|---|---|
| EP | | 2586610 | A1 * | 5/2013 | ............ B32B 17/10 |
| EP | | 2 640 549 | A1 | 9/2013 | |
| EP | | 3 399 595 | A1 | 11/2018 | |
| JP | | 2017073635 | A * | 4/2017 | |
| WO | WO 2012/066324 | A1 | | 5/2012 | |
| WO | WO 2014/060203 | A1 | | 4/2014 | |
| WO | WO 2015/050762 | A1 | | 4/2015 | |
| WO | WO-2019048705 | A1 * | | 3/2019 | |

OTHER PUBLICATIONS

Machine translation of CN 108162728 A.*
Machine translation of EP 2586610 A1.*
Machine translation of JP 2017/073635 A.*
Machine translation of WO 2019/048705 A1.*
International Search Report issued on Jun. 19, 2020 in PCT/EP2020/062006 filed Apr. 30, 2020, 4 pages.

* cited by examiner

GLAZING UNIT WITH FREQUENCY SELECTIVE COATING AND METHOD

TECHNICAL FIELD

The present invention relates to a glazing unit with frequency selective coating.

BACKGROUND ART

The invention is concerned generally with provision of a surface on a coated glass panel, which has frequency selective transmission characteristics and, in some embodiments, to providing such a surface on glazing sheets having a coating system such as a solar control coating deposited thereon.

In glazing for buildings and automotive applications, antennas for reception and, or transmission of radio frequency (RF) waves are commonly incorporated. These may be realised as, for example, conductive films deposited on the glazing or metal wires or strips attached thereto. In laminated glazings, which typically comprise two or more glass sheets bonded by a polymer interlayer, the antennas might be located within the laminate i.e. within the interlayer or on a glass surface contacting the interlayer.

In addition, in many cases additional equipment is operated within the vehicle or the building, which radiates and/or receives radiofrequency signals. To ensure function of this equipment, sufficient transmittance through the glazing is necessary.

Although glazing unit, particularly for automotive applications, are predominantly formed in glass, other materials such as polycarbonates are known and references to glass throughout this application should not be regarded as limiting.

In order to reduce the accumulation of heat in the interior of a building or vehicle, a glazing unit may be coated with a coating system, for example a solar control coating system, that absorbs or reflects solar energy. Inclusion of solar control films, particularly on glazings for use in warm, sunny climates, is desirable because they reduce the need for air conditioning or other temperature regulation methods. This affords savings in terms of energy consumption and environmental impact.

Such coating systems, however, are typically electrically conductive and are high in reflectance for RF radiation. This effect impedes reception or transmission by antennas.

This makes the coating systems efficient reflectors of broad bands of radio frequency signals. Furthermore, commercial construction, automotive, train, . . . tend to use other materials that further block RF signals. Materials such as concrete, brick, mortar, steel, aluminium, roofing tar, gypsum wall board, and some types of wood all offer varying degrees of RF absorption. The result is that many newer constructions severely impede RF signals from getting into or out of the buildings.

Nonetheless, RF devices have become an important part of modern life, especially with the huge penetration of cellular smartphones, tablets, IoT (Internet of Things) devices, that are requiring a deep penetration in the buildings or automotive of electromagnetic field for indoor coverage, even at high spectrum frequencies up to 30-40 GHz. Such devices may include cellular transceivers, wireless local area network ("wi-fi") transceivers, Global Positioning System (GPS) receivers, Bluetooth transceivers and, in some cases, other RF receivers (e.g., FM/AM radio, UHF, etc.). As the popularity of such devices has grown, the importance of being able to use RF-based features within the confines of modern commercial buildings has grown.

In addition, in order to increase the speed and capacity of wireless communication, frequency bands to be used are becoming higher, like the frequency bands for the 5th generation mobile communication system (5G). Therefore, even if a high-frequency electromagnetic wave having a broadband frequency band is used for a mobile communication, etc., it is necessary to have a wide band frequency selective surface in order to ensure the transmission of waves with different frequencies through the glazing unit.

The ITU IMT-2020 specification demands speeds up to 20 Gbps, achievable with wide channel bandwidths and massive MIMO 3rd Generation Partnership Project (3GPP) is going to submit 5G NR (New Radio) as its 5G communication standard proposal. 5G NR can include lower frequencies, below 6 GHz, and mmWave, above 15 GHz. However, the speeds and latency in early deployments, using 5G NR software on 4G hardware (non-standalone), are only slightly better than new 4G systems, estimated at 15% to 50% better. On top of that, IoT will requires indoor coverage as better as possible not for massive MTC (Machine Type Communication) but for critical MTC where robots or industrial devices are 5G wireless remotely controlled.

An object of one embodiment of the present invention is to provide a glazing unit capable of increasing the transmission of waves with lower frequencies, below 6 GHz, and mmWave, above 15 GHz through the glazing unit. In the middle gap bands, the usage is not planned for Mobile application from the latest WARC decisions.

Another object of one embodiment of the present invention is to provide a glazing unit capable of increasing the coverage in the other side of a glazing panel while reducing health risks.

SUMMARY OF INVENTION

It is an object of the present invention to alleviate these problems and especially the outdoor to indoor and/or the indoor to outdoor penetration, and to provide a glazing unit capable, in some configurations, of increasing the transmission of waves with lower frequencies, below 6 GHz, and mmWave, above 15 GHz reducing the loss attenuation level for both H or V polarization while reducing health risks by reducing the peak field.

According to a first aspect of the invention, the invention relates to an improved a glazing unit comprising a glass panel which is low in reflectance for RF radiation, a coating system which is high in reflectance for RF radiation disposed on the said glass panel. The invention can be used to implement also different devices like bandpass filters with scattering, resonators, multiband filters depending from the needs and geographical position of the building or the automotive for example. The glazing unit also comprises at least one frequencies selective decoated portion of the coating system extending along a plane, P, defined by a longitudinal axis, X, and a vertical axis, Z; having a width, DW, measured along the longitudinal axis, X, and a length, DL, measured along the vertical axis, Z and creating onto the glazing unit a dual band bandpass filter.

The at least one frequencies selective decoated portion comprises a first decoated element comprising a plurality of unit cells (34) forming a regular grid of n rows by m columns unit cells, $U_{m,n}$, m and n are positive integer higher than 5 (n>5 and m>5) forming three zones, zone A from $U_{1,n}$ to $U_{x,n}$, zone B from $U_{x+1,n}$ to $U_{y,n}$ and zone C from $U_{y+1,n}$ to $U_{m,n}$, x and y are positive integer respectively higher than 1 and x (x>1 and y>x).

$U_{m,n}$ represents the unit cell of the column m and row n.

The at least one frequencies selective decoated portion further comprises a plurality of second decoated elements wherein at least one second decoated element is placed in a unit cell (32) of the first decoated element and wherein no second decoated element is in contact with the first decoated element.

The solution as defined in the first aspect of the present invention is based on zone A and zone C each have more second decoated elements than zone B.

In some embodiments according to the invention, at least 75% of the unit cells of zone B have no second decoated element.

In some embodiments according to the invention, at least 75% of the unit cells of zones A and C have a second decoated element.

According to the invention, the at least one frequencies selective decoated portion comprises a plurality of third decoated elements having no contact with the first decoated element and having no contact with second decoated element. The glazing unit is able to let electromagnetic waves with three different ranges of wavelengths to pass through it meaning increasing the transmission of waves for example with lower frequencies, below 6 GHz, and mmWave, above 15 GHz, for example around 28 GHZ and around 37 GHz reducing the loss attenuation level for both H or V polarization of at most −10 decibels (dB) depending the indoor shaping of the building or automotive.

In some embodiments, at least one of the plurality of third decoated elements is placed in an unit cell of the first decoated element without a second decoated element.

In some embodiments, the at least one unit cell of the first decoated element having no second decoated element has no decoated element.

In some embodiments, zone C represents 25% of the unit cells of the column, preferably represents 35% of the unit cells of the column and more preferably represents 45% of the unit cells of the column.

In some embodiments, zone A and C have same amount of unit cells. In some variant of these embodiments, unit cells without second decoated element are symmetric in the raw meaning that the first half of the column is the mirror of the second half of the column for unit cells with and without second decoated element.

In some embodiments, the second and/or the third decoated elements comprising at least:
  a first segment AB wherein the point B is a free termination,
  a second segment CD wherein the point D is a free termination,
  an intersection point E between the first segment AB and the second segment CD forming sub-segments AE, EB, CE and ED wherein:
    the length, $\overline{EB}$, of the sub-segment EB is less than the length, $\overline{AE}$, of the sub-segment AE and higher than 0 (0<$\overline{EB}$<$\overline{AE}$),
    the length, $\overline{ED}$, of the sub-segment ED is less than the length, $\overline{CE}$, of the sub-segment CE and higher than 0 (0<$\overline{ED}$<$\overline{CE}$).

According to the invention, lengths of sub-segments AE and CE are such $\overline{AE}+\overline{CE}=n\lambda/2$ wherein n is a positive integer greater than 0.

In some embodiments, the second and/or the third decoated element further comprises more than or equal to one additional segment and interactions points between segments. Each segment has one interaction point with another segment and each segment has at most two intersection points preferably each segment has two interaction points with two different other segment to form a closed shape.

In preferred embodiments, the second decoated element comprises two additional segments:
  a third segment FG wherein the point F is a free termination and an intersection point H between the third segment FG and the second segment CD forming sub-segments FH, HG, CH, HE and ED wherein the length, $\overline{HG}$, of the sub-segment HG is less than the length, $\overline{FH}$, of the sub-segment FH and higher than 0 (0<$\overline{HG}$<$\overline{FH}$) and
  a fourth segment IJ wherein the point I is a free termination and an intersection point K between the four segment IJ and the third segment FG forming sub-segments IK, KJ, FK, KH and HG wherein the length, $\overline{KJ}$, of the sub-segment KJ is less than the length, $\overline{IK}$, of the sub-segment IK and higher than 0 (0<$\overline{KJ}$<$\overline{IK}$) forming central sub-segments and lateral sub-segments.

Preferably, the sum of lengths of longest lateral sub-segments of segments having only lateral sub-segments added to the length of central sub-segments of segments having a central sub-segment equals to $n\lambda/2$ wherein n is a positive integer greater than 0. For example, lengths of sub-segments AE, EH, HJ and IK are such $\overline{AE}+\overline{EH}+\overline{HJ}+\overline{IK}=n\lambda/2$ wherein n is a positive integer greater than 0.

According to the invention, and as explained hereunder, length of lengths of sub-segments and/or central segments can be smaller $n\lambda/2$ wherein n is a positive integer greater than 0 to have a low reflectance at the desire frequency because the invention improve the RF transparency and enlarge the bandwidth around the desire frequency even if a frequency shift occurs.

In some embodiments, the second and/or the third decoated element comprises a fourth segment IJ wherein the point I is a free termination, an intersection point K between the four segment IJ and the third segment FG forming sub-segments IK, KJ, FK, KH and HG wherein the length, $\overline{KJ}$, of the sub-segment KJ is less than the length, $\overline{IK}$, of the sub-segment IK and higher than 0 (0<$\overline{KJ}$<$\overline{IK}$) and an intersection point L between the four segment IJ and the first segment AB forming sub-segments AL, LE, EB, IL, LK and KJ wherein the length, $\overline{KJ}$, of the sub-segment KJ is less than the length, $\overline{KL}\ \overline{LK}$, of the sub-segment K and higher than 0 (0<$\overline{KJ}$<$\overline{LK}$). Preferably, the sum of the lengths of central sub-segments (sub-segments between intersection points), representing a closed structure, is equal to $n\lambda$ wherein n is a positive integer greater than 0 ($\overline{LE}+\overline{EH}+\overline{HK}+\overline{KL}=n\lambda$).

In some preferred embodiment, at least one angle formed by the intersection of two segment is 90°.

In some more preferred embodiment, each unit cell of first decoated element is a regular square with sides in X and Z axis to form a regular squared grid decoated element.

In some preferred embodiment, at least one segment of the second and/or the third decoated elements is substantially parallel to one side of the unit cells of the first decoated element.

In some embodiments, the glass panel comprises at least one glass sheet.

In some embodiments, the glass panel comprises two glass sheets separated by a spacer In some embodiments, the glass panel comprises two glass sheets laminated together by at least one interlayer.

According to the invention, the invention relates also to a method for manufacturing a glazing unit wherein
- the unit cells of first decoated element are a regular squares with sides in X and Z axis to form a regular squared grid first decoated element,
- the plurality of second decoating elements comprises four segments with two segments substantially parallel to the X-axis and to one side of the first decoated element and two segments substantially perpendicular to the two other segments and four intersection points, wherein each section has three sub-segments, one central sub-segment and two lateral sub-segments, and each central sub-segment of each segment has substantially the same length than the other central sub-segments, comprising the steps of:
- A. removing a portion of the coating by laser ablation to form a first line in the X-axis of the first decoated element,
- B. repeating the step A to provide all lines in the X-axis of the first decoated element.
- C. removing a portion of the coating by laser ablation to form a first line in the Z-axis of the first decoated element,
- D. repeating the step C to provide all lines in the Z-axis of the first decoated element.
- E. removing a portion of the coating by laser ablation to form a first discontinued line in the X-axis in order to create a first segment in the X-axis of the second decoated elements,
- F. removing a portion of the coating by laser ablation to form a second discontinued line in the X-axis adjacent to the first discontinued line in order to create a second segment in the X-axis of the second decoated elements,
- G. repeating the step E and F to provide all segments in the X-axis of second decoated elements.
- H. removing a portion of the coating by laser ablation to form a first discontinued line in the Z-axis in order to create a first segment in the Z-axis of the second decoated elements,
- I. removing a portion of the coating by laser ablation to form a second discontinued line in the Z-axis adjacent to the first discontinued line in order to create a second segment in the Z-axis of the second decoated elements,
- J. repeating the step H and I to provide all segments in the Z-axis of second decoated elements.

In some preferred embodiments, steps E and F can be executed before step B in order to optimize the time and the laser path in the X-axis.

In some preferred embodiments, steps H and I can be executed before step D in order to optimize the time and the laser path in the Z-axis.

According to the invention, steps A, B, E, F and G can be made in the Z-axis and then steps C, D, H, I and J in the X-axis.

According to the invention, the invention relates also to a method for manufacturing a glazing unit according to the invention comprising steps of
- A. removing a part of the at least one frequencies selective decoated portion by laser ablation to form a first dimension of the first decoated element
- B. removing a part of the at least one frequencies selective decoated portion by laser ablation to form a second dimension of the first decoated
- C. In case of the first decoated element has more than two dimensions, repeat step B as many time as the first decoated element has dimensions
- D. removing a part of the at least one frequencies selective decoated portion by laser ablation the first segment of the plurality of second and/or the third decoated elements.
- E. removing a part of the at least one frequencies selective decoated portion by laser ablation a second segment of the plurality of second and/or the third decoated elements
- F. In case of a second and/or the third decoated element has more than two segments, repeat step B as many time as the second decoated element has segments in addition to the first two segments.

According to the invention, the invention relates also to a method for manufacturing a glazing unit wherein
- the unit cells of first decoated element are a regular squares with sides in X and Z axis to form a regular squared grid first decoated element,
- the plurality of second decoating elements comprises four segments with two segments substantially parallel to the X-axis and to one side of the first decoated element and two segments substantially perpendicular to the two other segments and four intersection points, wherein each section has three sub-segments, one central sub-segment and two lateral sub-segments, and each central sub-segment of each segment has substantially the same length than the other central sub-segments, comprising the steps of:
- A. removing a portion of the coating by laser ablation to form a first line in the X-axis of the first decoated element,
- B. removing a portion of the coating by laser ablation to form a first discontinued line in the X-axis in order to create a first segment in the X-axis of the second decoated elements,
- C. removing a portion of the coating by laser ablation to form a second discontinued line in the X-axis adjacent to the first discontinued line in order to create a second segment in the X-axis of the second decoated elements,
- D. repeating the step A, B and C to provide all lines in the X-axis of the first and second decoated elements.
- E. removing a portion of the coating by laser ablation to form a first line in the Z-axis of the first decoated element,
- F. removing a portion of the coating by laser ablation to form a first discontinued line in the Z-axis in order to create a first segment in the Z-axis of the second decoated elements,
- G. removing a portion of the coating by laser ablation to form a second discontinued line in the Z-axis adjacent to the first discontinued line in order to create a second segment in the Z-axis of the second decoated elements,
- H. repeating the step E, F and G to provide all lines in the Z-axis of the first and second decoated elements.

In some preferred embodiments, steps A, B, C and D can be made in the Z-axis and then steps E, F, G and H in the X-axis.

It is noted that the invention relates to all possible combinations of features recited in the claims or in the described embodiments.

The following description relates to an building window unit but it's understood that the invention may be applicable to others fields like automotive or transportation windows which have to be attached such as train.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

FIGS. 4 to 9 are schematic views of some exemplifying embodiments of a portion of a frequencies selective decoated portion of the coating system according to the invention.

DESCRIPTION OF EMBODIMENTS

Figure 1:
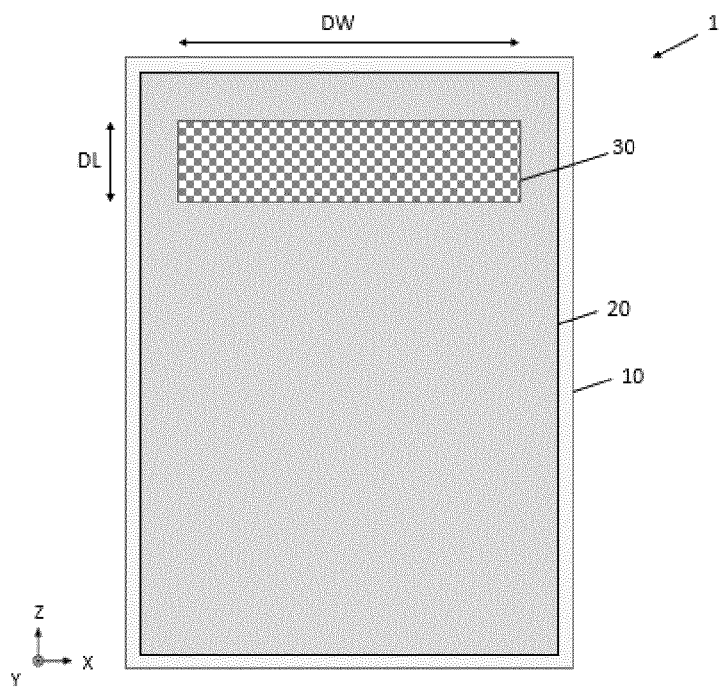
FIGS. 1 to 3 are schematic views of a glazing unit according to some exemplifying embodiments of the present invention.

For a better understanding, the scale of each member in the drawing may be different from the actual scale. In the present specification, a three-dimensional orthogonal coordinate system in three axial directions (X axis direction, Y axis direction, Z axis direction) is used, the width direction of the frequencies selective decoated portion is defined as the X direction, the thickness direction is defined as the Y direction, and the height is defined as the Z direction. The direction from the bottom to the top of the frequencies selective decoated portion is defined as the +Z axis direction, and the opposite direction is defined as the –Z axis direction. In the following description, the +Z axis direction is referred to as upward and the –Z axial direction may be referred to as down.

The following description relates to an column of the first decoated element but it's understood that the invention may be applicable for columns and rows. As shown in some examples according to the invention hereunder.

With reference to FIG. 1, a first embodiment of the present invention is described.

As shown in FIG. 1, a glazing unit 1 comprises a glass panel 10 which is low in reflectance for RF radiation, a coating system 20 which is high in reflectance for RF radiation disposed on the said glass panel. The glazing unit further comprises at least one frequencies selective decoated portion 30 of the coating system extending along a plane, P, defined by a longitudinal axis, X, and a vertical axis, Z; having a width, DW, measured along the longitudinal axis, X, and a length, DL, measured along the vertical axis, Z.

FIG. 1 shows a rectangular shape frequencies selective decoated portion 30 of the coating system. This shape can be different for example, a square, a circle, a polygon, . . . depending of the desired application.

In FIG. 1, the rectangular shape frequencies selective decoated portion 30 of the coating system is placed on the top part of the glazing unit.

Figure 2:
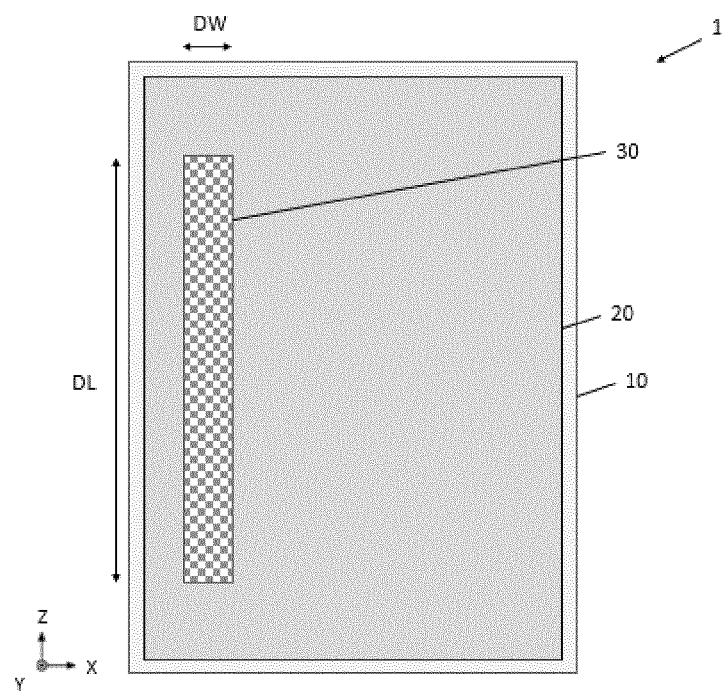

FIG. 2 shows some embodiments according to the present invention where the at least one frequencies selective decoated portion 30 of the coating system is placed on one side of the glazing unit.

Figure 3:
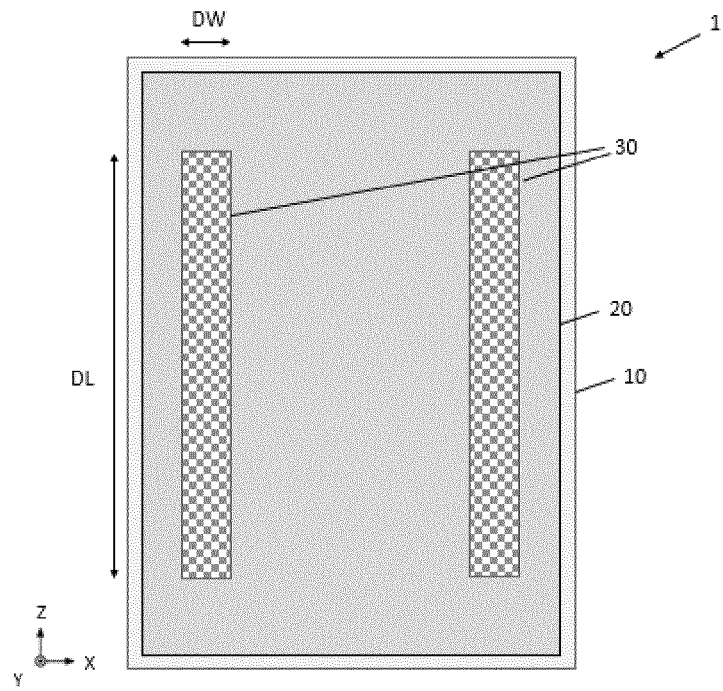

FIG. 3 shows some embodiments according to the present invention where the glazing unit comprises two frequencies selective decoated portions 30 of the coating system.

In some embodiments, the at least one frequencies selective decoated portions 30 of the coating system can be on the entire or on the majority of the surface of the coating system or can be limited to a defined area.

In some embodiments, the glass panel 10 is at least transparent for visible waves in order to see-through and to let light passing through.

In some preferred embodiments, the glass panel 10 comprises at least one glass sheet.

In some preferred embodiments, the glass panel 10 comprises at least two glass sheets separated by a spacer allowing to create a space filled by a gas like Argon to improve the thermal isolation of the glass panel, creating an insulating glazing panel.

In the present embodiment, the rectangle includes not only a rectangle or a square but also a shape obtained by chamfering corners of a rectangle or a square. The shape of the glass panel 10 in a plan view is not limited to a rectangle, and may be a circle or the like.

In another embodiment, the glass panel can be a laminated glass panel to reduce the noise and/or to ensure the penetration safety. The laminated glazing comprises glass panels maintained by one or more interlayers positioned between glass panels. The interlayers employed are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

In some embodiments, when the glass panel comprises several glass sheets, different or same coating system can be placed on different surface of different glass sheets. Preferably, every coating system has at least one frequencies selective surface and more preferably, every of same at least one frequencies selective surface are in front of each other.

As the material of the glass panel 10, for example, soda-lime silica glass, borosilicate glass, or aluminosilicate glass can be mentioned or other materials such as thermoplastic polymers, polycarbonates are known, especially for automotive applications, and references to glass throughout this application should not be regarded as limiting.

The glass panel 10 can be manufactured by a known manufacturing method such as a float method, a fusion method, a redraw method, a press molding method, or a pulling method. As a manufacturing method of the glass panel 10, from the viewpoint of productivity and cost, it is preferable to use the float method.

The glass panel 10 can be flat or curved according to requirements by known methods such as hot or cold bending.

The glass panel 10 can be processed, ie annealed, tempered, . . . to respect with the specifications of security and anti-thief requirements.

The glass sheet can be a clear glass or a coloured glass, tinted with a specific composition of the glass or by applying an additional coating or a plastic layer for example.

In case of several glass sheets, in some embodiments, each glass sheet can be independently processed and/or coloured, . . . in order to improve the aesthetic, thermal insulation performances, safety, . . . .

The thickness of the glass panel 10 is set according to requirements of applications.

The glass panel 10 can be formed in a rectangular shape in a plan view by using a known cutting method. As a method of cutting the glass panel 10, for example, a method in which laser light is irradiated on the surface of the glass panel 10 to cut the irradiated region of the laser light on the surface of the glass panel 10 to cut the glass panel 21, or a method in which a cutter wheel is mechanically cutting can be used. The glass panel can have any shape in order to fit with the application, for example a windshield, a sidelite, a sunroof of an automotive, a lateral glazing of a train, a window of a building, . . . .

In addition, the glazing unit 10 can be assembled within a frame or be mounted in a double skin façade, in a carbody or any other means able to maintain a glazing unit. Some plastics elements can be fixed on the glazing panel to ensure the tightness to gas and/or liquid, to ensure the fixation of the glazing panel or to add external element to the glazing panel.

Low in reflectance for RF radiation means that RF radiation are mostly transmitted through the material where high in reflectance for RF radiation means that RF radiation are mostly reflected on the surface of the material and/or absorbed by the material and the attenuation is at level of 20 decibels (dB) or more. Low in reflectance means an attenuation at level of 10 decibels (dB) or less. The coating system which is high in reflectance for RF radiation means that the coating system is non-transmitting to RF radiation.

According to the invention, the coating system 20 can be a functional coating in order to heat the surface of the glazing panel, to reduce the accumulation of heat in the interior of a building or vehicle or to keep the heat inside during cold periods for example. Although coating system are thin and mainly transparent to eyes.

The coating system 20 can be made of layers of different materials and at least one of this layer is electrically conductive. The coating system is electrically conductive over the majority of one major surface of the glazing panel.

The coating system 20 of the present invention has an emissivity of not more than 0.4, preferably less than 0.2, in particular less than 0.1, less than 0.05 or even less than 0.04. The coating system of the present invention may comprise a metal based low emissive coating system; these coatings typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometres, mostly about 5 to 20 nm. Concerning the dielectric layers, they are transparent and traditionally each dielectric layer is made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

For example, the coating system 20 is applied to the glazing unit 1 to transform it to a low-E glazing unit. This metal-based coating system such as low-E or heatable coating systems.

In some embodiment, the coating system 20 can be a heatable coating applied on the glazing unit to add a defrosting and/or a demisting function for example.

As the coating system, for example, a conductive film can be used. As the conductive film, for example, a laminated film obtained by sequentially laminating a transparent dielectric, a metal film, and a transparent dielectric, ITO, fluorine-added tin oxide (FTO), or the like can be used. As the metal film, for example, a film containing as a main component at least one selected from the group consisting of Ag, Au, Cu, and Al can be used.

Preferably, the coating system is placed on the majority of one surface of the glazing unit and more preferably on the whole used surface of the glazing panel.

In some embodiments, a masking element, such as an enamel layer, can be add on a part of the periphery of the glazing unit.

A simple approach to this problem of RF energy reflection is to remove a portion of the coating system to avoid to have a high reflectance for RF radiation. This approach, however, reduces the solar control benefits offered by the glazing unit and for equipment located inside the building, the vehicle or the car, the region would be unacceptably large. On top of that, the transition between the decoated portion and the coating itself is eye-visible and usually non-accepted by users.

Another solution has been to cut lines in the coating system to create a surface which is frequency selective, that is, it has relatively high reflectivity/absorbance for solar energy but relatively low in the RF region of the electromagnetic spectrum. The cutting may be performed by laser ablation and the spacing of the slits is chosen to provide selectivity at the desired frequency.

To solve these problems, the invention is based on the at least one frequencies selective decoated portion of the coating system comprising a first decoated element comprising a plurality of unit cells forming a regular grid of n rows by m columns unit cells, m and n are positive integer higher than 1 (n>1 and m>1), and a plurality of second decoated elements wherein a second decoated element is placed in an unit cell of the first decoated element and wherein no second decoated element is in contact with the first decoated element.

According to the invention, the at least one frequencies selective decoated portion of the coating system may be a series or pattern of intersecting ablated paths may be created in the coating system, while leaving behind the coating system in untouched areas and only a very small percentage of the area of the coating system is removed from the glazing panel, and most of the coated glass remains untouched to keep performances of the coating system.

These paths are produced in such a way as to create areas of the coating system that are electrically isolated allowing the glazing panel to retain most of its energy conserving properties or heatable properties, while the ablated paths allow passage of RF signals through the glazing panel.

In various embodiments, paths can be made by pulse laser to create spots. The diameter of the spot is about 20-25 um, so that each path will be approximately this width. In alternative embodiments, different sized spots (e.g., 10-200 microns in diameter) and paths may be used. Moreover, the spots overlap and the amount of overlap may be approximately 50% by area; the extent of overlap may vary in alternative embodiments. In some embodiments, the overlap may range from 25% to over 90% for example. The pattern of ablated intersecting paths may be varied.

According to the invention, the first decoated element is a regular grid with grid-like pattern formed by a plurality of interconnected unit cells. Unit cell is the smallest and closed building block whose geometric arrangement defines the regular grid.

The plurality of unit cells of the regular grid may have several shapes as long as unit cells are connected to each other meaning that at least a part of paths that create unit cells is used to create multiple unit cells.

In some embodiments, unit cells have a rectangular-like shape, and preferably a square-like shape. In these embodiments, a side of a unit cell is used to create the adjacent unit cell in order to create a rectangular-like grid, preferably a square-like grid of n rows by m columns unit cells, m and n are positive integer higher than 5 (n>5 and m>5).

According to the invention, unit cells are not limited to rectangular or square shapes and may have any pattern that enhances transmission of desired RF signals of a particular polarization.

The pattern of unit cells can be a honeycomb pattern where sides of honeycomb are used for adjacent unit cells.

The pattern may also be a circle pattern. In these embodiments, circular unit cells are tangentially connected to adjacent unit cells meaning that each circle is touching the adjacent circle by a single point.

In a first decorating element, no particular unit cells is necessarily superior to another and preferably, all unit cells have same dimensions.

In some embodiments, the decoated area of a coated system may be 3% or less of the total coated area depending of the application, the material used in the glazing unit, . . . . In other embodiments, a different percentage may be used (e.g. 5% or less total area of the coating system removed, and 95% total area of a coating system retaining untouched). In other embodiments, the coated system is decoated on at least one portion of his surface, this decoated portion represents less than 2% of the coating. In others embodiments, several decoated portion can be present and the decoated surface is at most 3% of the total coated area.

Note that while ablation of a higher percentage of the area may improve the transmission of RF signals through the glazing unit, ablation of more of the coating system diminishes the energy conserving properties heatable performances of the glazing unit.

In some embodiments, the grid spacing can be range from 2-10 mm. In general, smaller isolated areas of coating system facilitate improved RF transmission at shorter wavelengths, whereas larger overall size of the entire ablated pattern tends to facilitate longer wavelengths. Patterns that need to allow or transmission of multiple RF frequencies, while providing maximum transmission across all those frequencies, may have an overall ablation area dictated by the longer wavelengths while simultaneously having the grid/line spacing dictated by the shorter wavelengths.

According to the invention, the dimension of the at least one frequencies selective decoated portion depends from the outdoor and/or indoor field intensity and incidence angle and/or from the application.

In some embodiments, the dimensions at least one frequencies selective decoated portion are DW and DL may be comprised in the range of 5 to 70 cm, for example DW×DL or DL×DW can be 10×5 cm, 10×10 cm, 15×15 cm, 40×20 cm or 70×30 cm.

In some embodiments, DW is longer than DL. The at least one frequencies selective decoated portion can be placed on the top or on the bottom of the glazing unit in order to be more discreet. The top of the of the glazing unit means a higher Z value where the bottom is a lower Z value.

In some embodiments, DL is longer than DW. The at least one frequencies selective decoated portion can be placed on a side of the glazing unit in order to be more discreet. The side of the glazing unit means a upper or lower X value.

In some embodiments, the glazing unit may comprises more than one frequencies selective decoated portion as shown in FIG. 3. These more than one frequencies selective decoated portion can be placed in several places in order to minimize the visual distortion. Each decoated portion may have different dimensions and design.

In some embodiments, the coating system can be decoated to have the at least one frequencies selective decoated portion can be placed on the majority of the coating system surface.

The overall area of the pattern may vary in different embodiments. Complex decoating portions might be used to extend the bandwidth implementing multiband filters.

Figure 4:
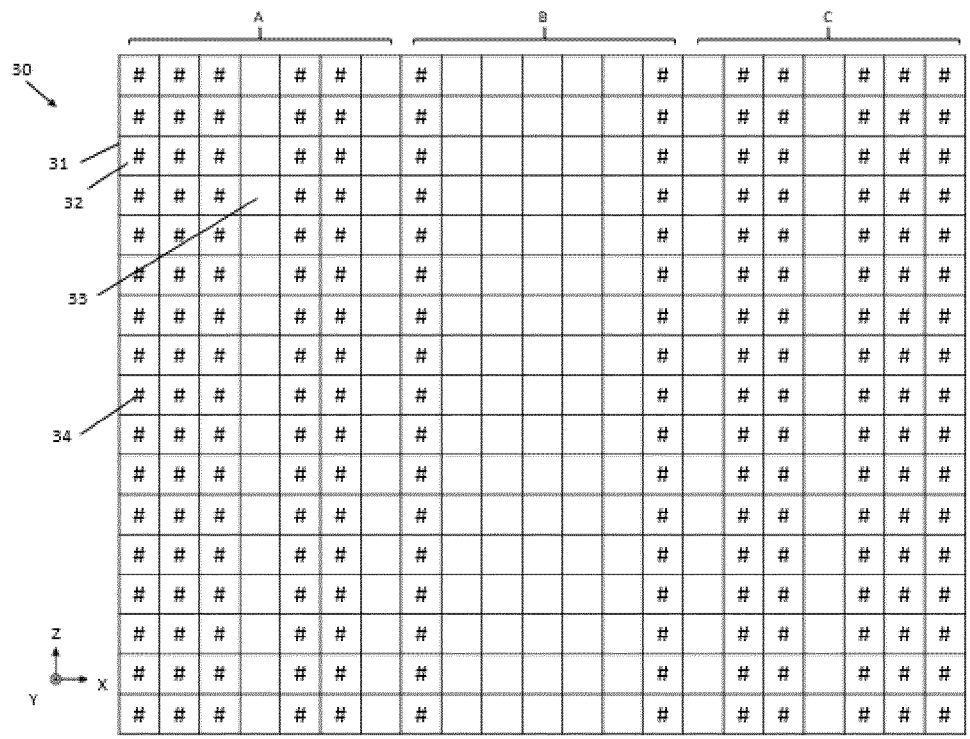

FIGS. 4 to 109 shows schematic views of some exemplifying embodiments of a portion of a frequencies selective decoated portion of the coating system according to the invention. The invention is not limited to these schematic views or shapes.

According to the invention, FIGS. 4 to 109 shows a portion of a frequencies selective decoated portion 30 of the coating system comprises a first decoated element 31 comprising a plurality of unit cells 34 forming a regular grid of n rows by m columns unit cells, m and n are positive integer higher than 5 (n>5 and m>5). In examples of FIGS. 4 to 7, n equals 17 (n=17) and m equals 21 (m=21). In examples of FIGS. 8 and 9, n equals 9 (n=9) and m equals 9 (m=9). The number of rows and columns may vary according to the size of the coating area, the size of the frequencies selective decoated portion, the application, the design, . . . . The frequencies selective decoated portion also comprises a plurality of second decoated elements 34 wherein at least one second decoated element is placed in an unit cell 32 of the first decoated element and wherein no second decoated element is in contact with the first decoated element.

Figure 5:
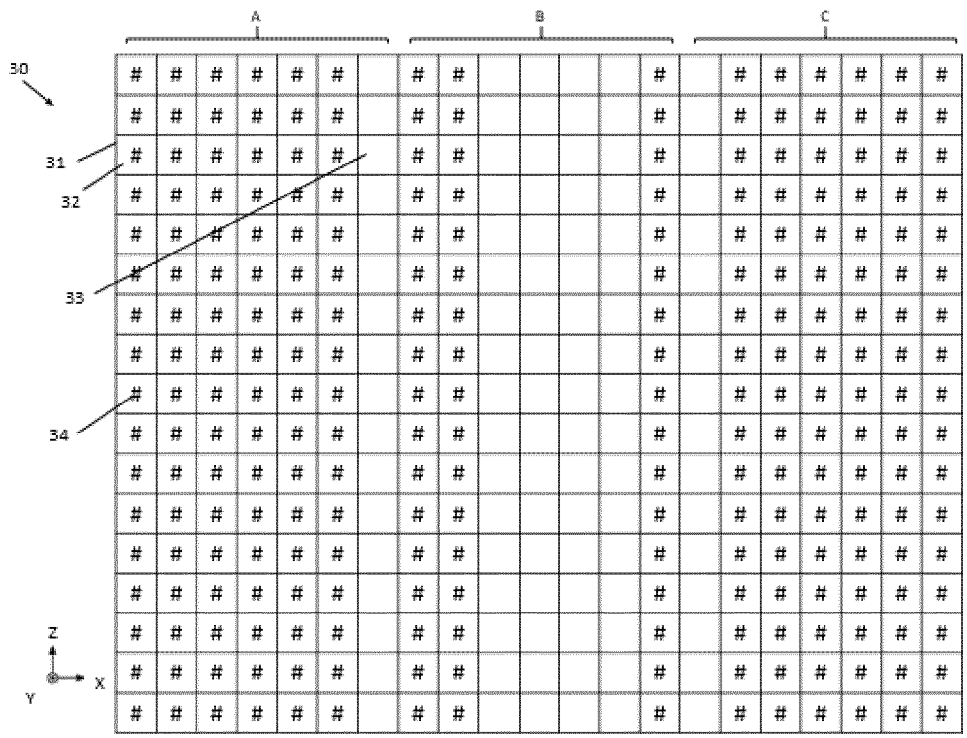

In FIGS. 4 and 5, zone A is defined by a x=7 representing $U_{1,n}$ to $U_{7,n}$, zone B is defined by a y=14 representing $U_{8,n}$ to $U_{14,n}$, and zone C represents $U_{15,n}$ to $U_{21,n}$.

In FIG. 4, zone B has two unit cells with second decoated elements, $U_{8,n}$ and $U_{14,n}$ where zone A has five unit cells with second decoated elements $U_{1,n}$, $U_{2,n}$, $U_{3,n}$, $U_{5,n}$ and $U_{6,n}$ and zone C has five unit cells with second decoated elements $U_{16,n}$, $U_{17,n}$, $U_{19,n}$, $U_{20,n}$ and $U_{21,n}$.

In FIG. 5, zone B has three unit cells with second decoated elements, $U_{8,n}$, $U_{9,n}$ and $U_{14,n}$ where zone A has six unit cells with second decoated elements $U_{1,n}$, $U_{2,n}$, $U_{3,n}$, $U_{4,n}$, $U_{5,n}$ and $U_{6,n}$ and zone B has six unit cells with second decoated elements $U_{16,n}$, $U_{17,n}$, $U_{18,n}$, $U_{19,n}$, $U_{20,n}$ and $U_{21,n}$.

Figure 6:
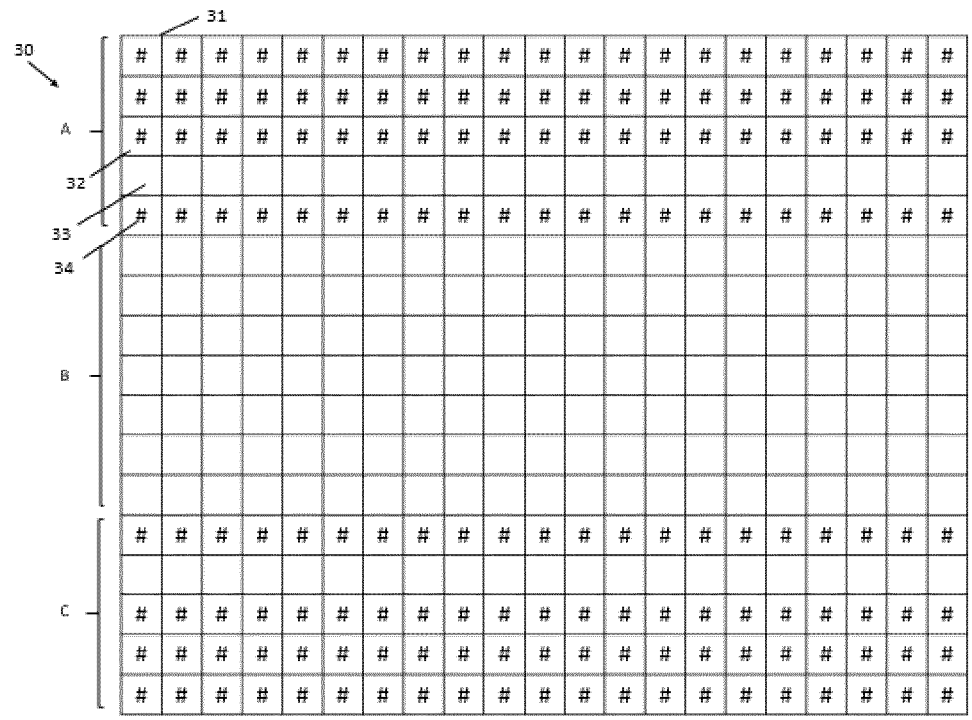

In FIG. 6, where rows are used instead of columns according to the invention, zone A is defined by a x=5 representing $U_{m,1}$ to $U_{m,5}$, zone B is defined by a y=12 representing $U_{m,6}$ to $U_{m,12}$, and zone C represents $U_{m,13}$ to $U_{m,21}$.

In FIG. 6, zone B has no unit cells with second decoated elements where zone A has four unit cells with second decoated elements $U_{m,1}$, $U_{m,2}$, $U_{m,3}$ and $U_{m,5}$, and zone C has six unit cells with second decoated elements $U_{16,n}$, $U_{17,n}$, $U_{18,n}$, $U_{19,n}$, $U_{20,n}$ and $U_{21,n}$.

Figures 7, 8:
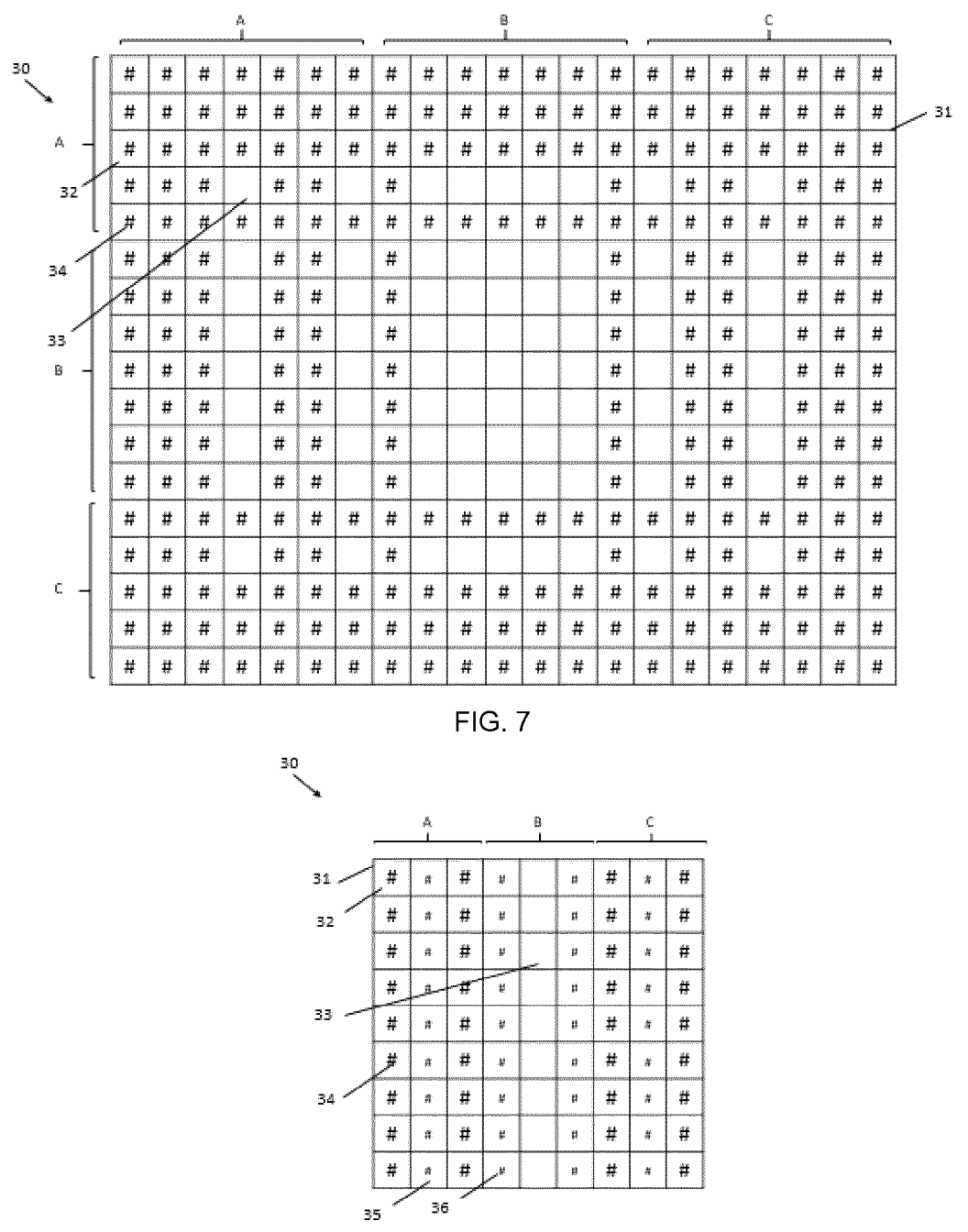

In FIG. 7, where rows and columns are used instead of columns according to the invention, zone A of rows is defined by a x=5 representing $U_{m,1}$ to $U_{m,5}$, zone B of rows is defined by a y=12 representing $U_{m,6}$ to $U_{m,12}$, and zone C of rows represents $U_{m,13}$ to $U_{m,21}$ and zone A of columns is defined by a x=7 representing $U_{1,n}$ to $U_{1,n}$, zone B of columns is defined by a y=14 representing $U_{8,n}$ to $U_{14,n}$, and zone C of columns represents $U_{15,n}$ to $U_{21,n}$.

In FIG. 7, zone B considered in row or in column even both has les unit cells with second decoated elements than zone A and zone B.

in these examples, the first decoated element has at least one unit cell 33 of the first decoated element has no second decoated element.

In some embodiments, several unit cells of a row and/or a column of the first decoated element have no second decoated element.

Do not have second decoated element in several unit cells allows to keep the transmission of waves with lower frequencies, below 6 GHz, and mmWave, above 15 GHz reducing the loss attenuation level for both H or V polarization of at most −10 decibels (dB) depending the indoor shaping of the building or automotive by changing esthetic of the glazing unit while improving the scattering of waves.

Figure 9:
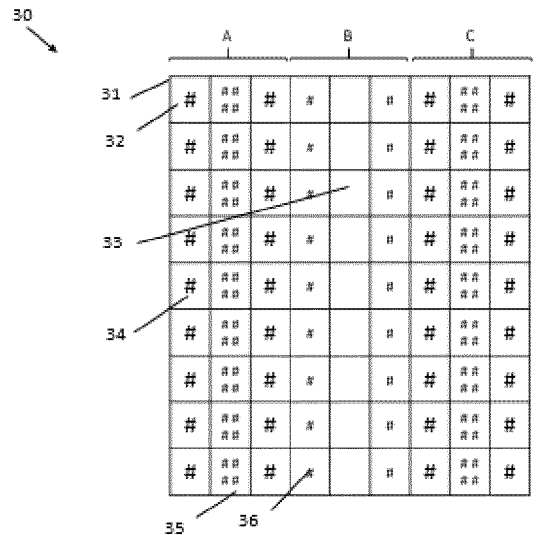

In some embodiments, as shown in FIGS. 8 and 9, at least one frequencies selective decoated portion comprises a plurality of third decoated elements 36 having no contact with the first decoated element 31 and second decoated element 34 allowing to pass through it meaning increasing the transmission of waves at three different ranges of wavelengths.

For example with lower frequencies, below 6 GHz, and mmWave, above 15 GHz, for example around 28 GHZ and around 37 GHz reducing the loss attenuation level for both H or V polarization of at most −10 decibels (dB) depending the indoor shaping of the building or automotive.

According to the invention, there is no contact between the second decoated element 34 and the first decoated element 31 represented, but not limited to, by a square unit cell of the first decoated element allowing to avoid a direct coupling between the first decoated element and second decoated elements.

According to the invention, more than one second and/or third decoated element may be in a same unit cell as shown in FIG. 7, where unit cells 35 owns four third decoated elements, no decoated element is in contact with another one. These second or third decoated elements are not in contact each other or with the unit cell of the first decoated element.

According to the invention, no second decoated element is in contact with the first decoated element meaning that paths to create second decoated element is not touching paths to create first decoated element. The coating system between the second decoated element and the first decoated element is untouched.

According to the invention, no third decoated element is in contact with the first decoated element and second decoated element meaning that paths to create second decoated element is not touching paths to create first decoated element. The coating system between the second decoated element and the first decoated element is untouched.

According to the invention, a segment is a part of a line that is bounded by two distinct end points and may be a straight segment or a curved segment, such as a part of a sinusoidal-like line.

According to the invention, a sub-segment is part of a segment that is bounded by two distinct end points of the said segment.

According to the invention, a free termination is an end-point without any other segment intersecting this said end-point.

According to the invention, a central sub-segment is a part of a segment that is bounded by two distinct end points of the said segment and these said two distinct end points are intersection points with other segments.

According to the invention, a lateral sub-segment is a part of a segment that is bounded by two distinct end points of the said segment and one of these said two distinct end points is a free termination and the other distinct end-point is an intersection point with another segment.

Preferably, every segment has two free terminations to create lateral sub-segments.

According to the invention, the length of a segment or a sub-segment is the distance, following the line of the segment or sub-segment, between the two distinct end points and written with a overline over the segment or sub-segment endpoints such as the length of a segment XY is $\overline{XY}$.

Surprisingly, lateral sub-segments of the second and/or third decoated elements ED and EB improve the transmission of RF radiation thought the glazing unit by enlarging the bandwidth.

According to the invention, the angle formed by segments can vary from, non-comprised, 0° to, non-comprised, 360° as long as segments are distinct meaning that an angle of a multiple of 0°, 180° or 360° is not possible to obtain distinct segments or distinct sub-segments.

According to the invention, at least two segments of the second decoated element have lateral sub-segments. Preferably, all segments have lateral sub-segment in order to improve the width of the passing band.

According to the invention and as shown in FIGS. 4 to 9, the second decoated element 34 comprises more than or equal to one additional segment, GF, IJ and/or MN, meaning that the second decoated element comprises at least three segments. Each segment has one interaction point with another segment meaning that two segments can have only one interaction point between these said two segments. Preferably, each segment has at most two intersection points meaning that a segment can intersect at most two different segments.

In some preferred embodiments, each segment has two interaction points with two different other segments to form a closed shape such as a polygon, for example a triangle with three segments, a rectangle, a square or a diamond with four segments, a pentagon with five segments, an honeycomb with six segments, or an polygon with different shape, lengths of segments and angles between segments.

Figure 12:
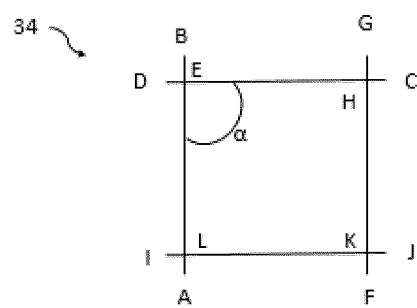
Figure 13:
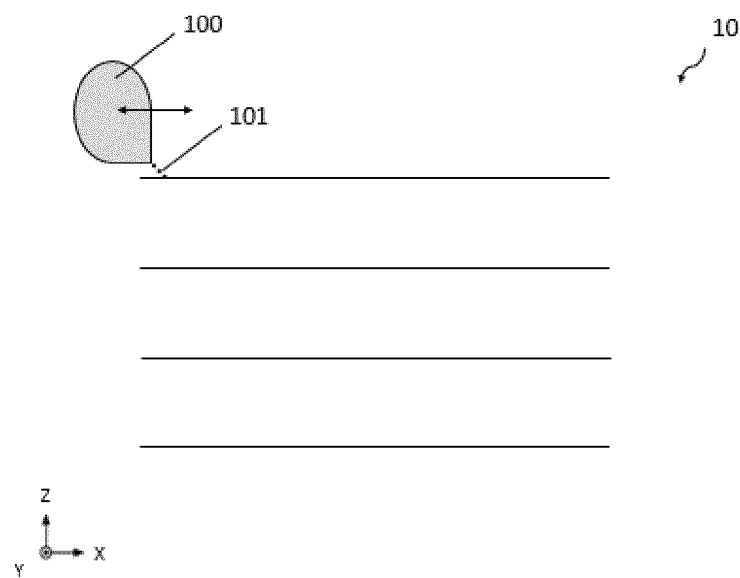
FIGS. 13 to 16 are schematic views of a method for manufacturing a glazing unit according to the invention.
Figure 14:
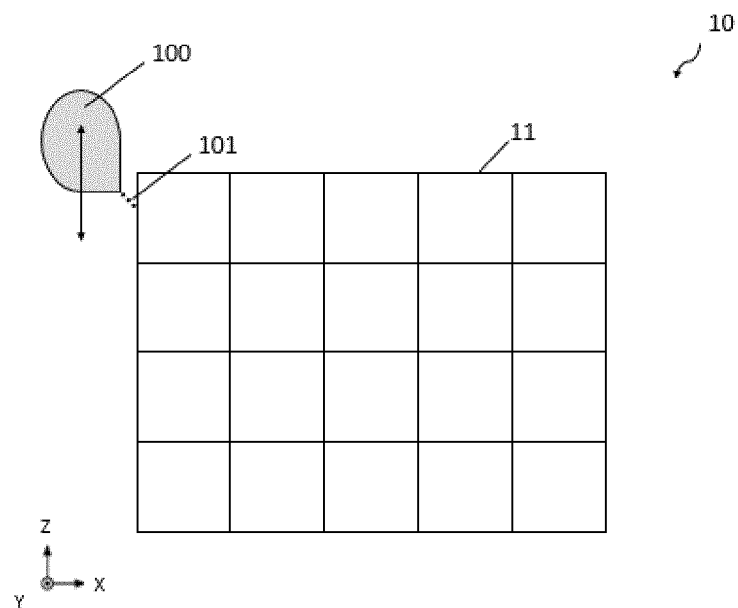
Figure 15:
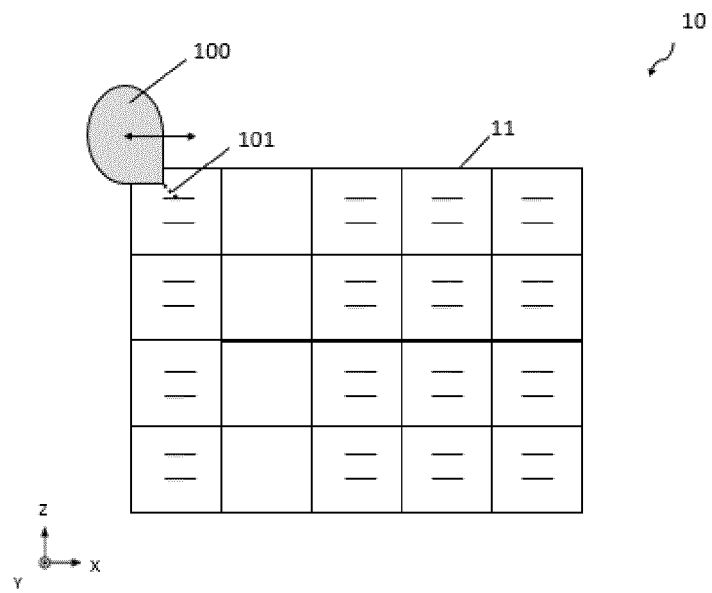
Figure 16:
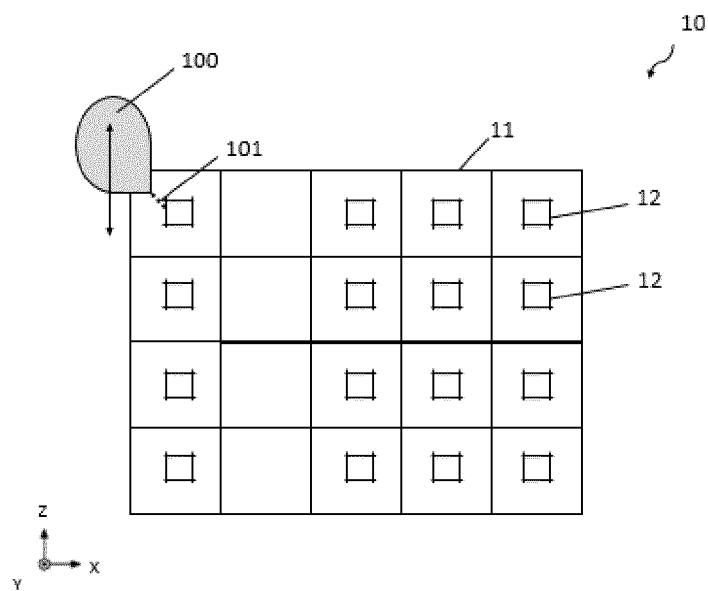
Figure 17:
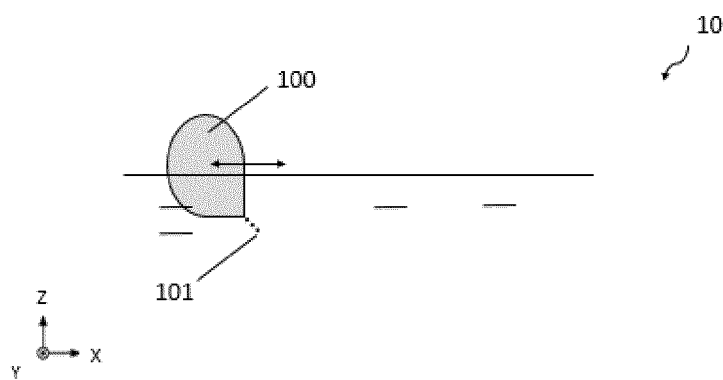
FIGS. 17 to 21 are schematic views of a method for manufacturing a glazing unit according to the invention.
Figure 18:
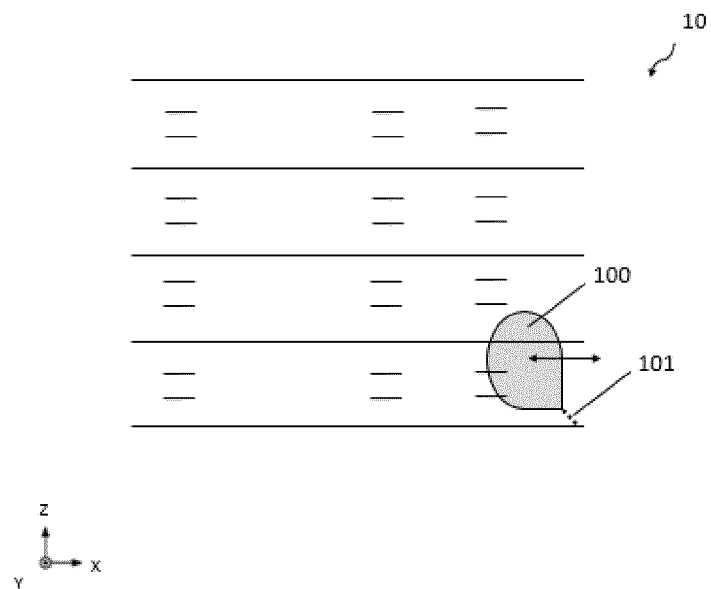
Figure 19:
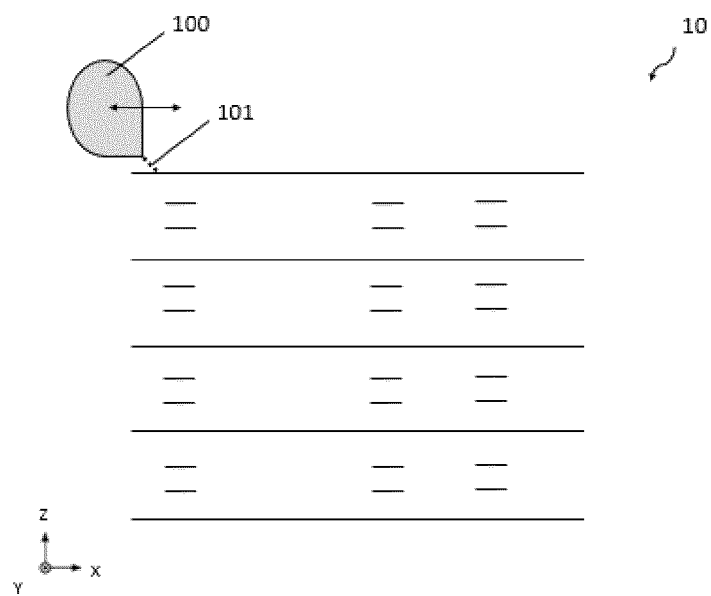
Figure 20:
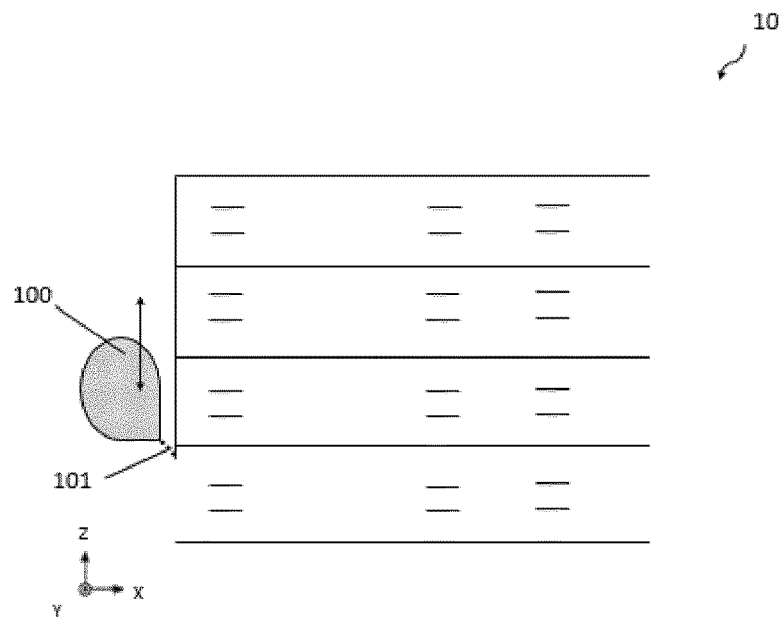
Figure 21:
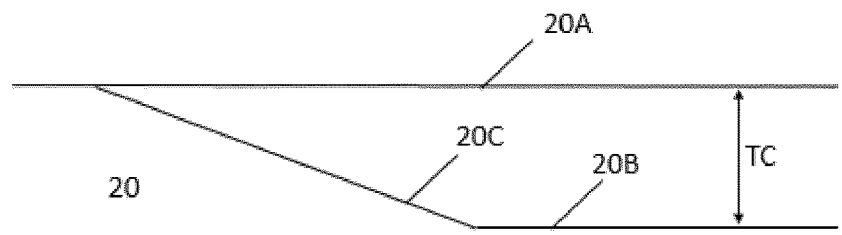

In some embodiments, as shown in FIGS. 4 to 9, the second decoated element 34 has a four segments, AB, CD, FG and IJ, forming a square meaning that two segments are substantially parallel together. In these embodiments with four intersections points between segments, E H, K and L. These four segments have a central segment, respectively LE, EH and HK and KL, and two lateral sub-segments, respectively AL, IL, DE, EB, GH, CH, KJ and KF. In these embodiments, the length of central sub-segments are substantially equal and angles α formed between segments is substantially equals to 90° as shown in FIG. 12.

In some preferred embodiments, the length, $\overline{LE}$, $\overline{EH}$, $\overline{HK}$ and $\overline{KL}$, of all central sub-segments (LE, EH, HK and KL), forming a closed structure, of a second decoated element is equals nλ wherein n is a positive integer greater than 0 ($\overline{LE}+\overline{EH}+\overline{HK}+\overline{KL}=n\lambda$).

Surprisingly, smallest lateral sub-segments (AL, IL, DE, EB, GH, CH, JK and FK) of segments of the second decoated element 32 improve the transmission of RF radiation thought the glazing unit by enlarging the passing band.

In some embodiments, the glazing unit comprises more than one frequencies selective decoated portion on the coating. The first decoated element and second and/or third decoated elements of each frequencies selective decoated portion may have different sizes allowing to have different bandwidth to improve the RF transparency of the glazing panel with a coating system which is high in reflectance for RF radiation according to the invention.

In some embodiments, second decoated elements and/or third decoated elements of a frequencies selective decoated portion have the same dimensions meaning that second decoated elements of a frequencies selective decoated portion are substantially the same to each other in a same frequencies selective decoated portion.

In some other embodiments, dimensions of second decoated elements and/or third decoated elements of a frequencies selective decoated portion are different to enlarge the bandwidth.

For example, to let pass wavelengths with lower frequencies, below 6 GHz, and mmWave, above 15 GHz, for example around 28 GHZ reducing the loss attenuation level for both H or V polarization of at most −10 decibels (dB) depending the indoor shaping of the building or automotive, the first decoated element can be a grid with unit cells of 4×4 mm and the plurality of second decoated elements can have a length of segments of around 1.5 mm.

At a level of loss of 10 dB, the glazing unit according to the invention (solid curve) is RF transparent for sub-6 GHz and between around 22 GHz to 30 GHz radiations. The glazing unit according to the invention is capable of increasing the transmission of waves with lower frequencies, below 6 GHz, and mmWave, above 15 GHz through the glazing unit with attenuation level for H or V polarization of at most −10 decibels (dB).

Surprisingly, the presence of the second decoated elements clearly improves (around 3 dB depending of the frequency) the RF transparency of the glazing unit normally due to the first decoated element for sub-6 GHz radiations. The presence of a first decoated element and second decoated elements according to the invention improve the transmission of waves for sub-6 GHz and in the same time for mmWave in the better way than a first and second decoated elements placed next to each other or having independently a first and a second decoated elements on a coating of a glazing unit. Dimensions of the second decoated elements compared to dimensions of the first decoated element, according to the invention, improve the RF transparency for a defined frequency. Due to the invention, second decoated elements improve the RF transparency of the glazing unit at the desire frequency but also improve the RF transparency of the first decoated element while ensuring the scattering of the signal.

For example, to let pass wavelengths with lower frequencies, below 6 GHz, and mmWave, above 15 GHz, for example around 28 GHZ and around 37 GHz reducing the loss attenuation level for both H or V polarization of at most −10 decibels (dB) depending the indoor shaping of the building or automotive, the first decoated element can be a grid with unit cells of 4×4 mm, the plurality of second decoated elements can have a length of segments of around 1.5 mm and the plurality of third decoated elements can have a length of segments of around 1.05 mm.

In some other embodiments, to let pass wavelengths with lower frequencies, below 6 GHz, and mmWave, above 15 GHz, for example around 28 GHZ and around 37 GHz reducing the loss attenuation level for both H or V polarization of at most −10 decibels (dB) depending the indoor shaping of the building or automotive, the first decoated element can be a grid with unit cells of 4×4 mm, the plurality of second decoated elements can have a length of segments of around 1.75 mm with sub-segments of 0.1 mm and the plurality of third decoated elements can have a length of segments of around 1.25 mm.

One of the plurality of third decoated elements can be placed inside on of the second decoated element concentrically. In some embodiments, some unit cells can have not second or third decoated element.

Figure 10:
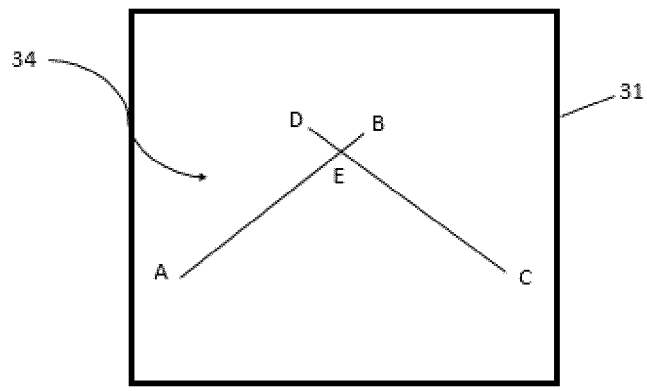
FIGS. 10 to 12 show schematic views of a second and/or a third decoated element.

According to the invention and as shown in FIG. 10, the second and/or third decoated elements 34, 36 comprise at least:
- a first segment AB wherein the point B is a free termination,
- a second segment CD wherein the point D is a free termination,
- an intersection point E between the first segment AB and the second segment CD forming sub-segments AE, EB, CE and ED wherein the length, $\overline{EB}$, of the sub-segment EB is less than the length, $\overline{AE}$, of the sub-segment AE and higher than 0 ($0<\overline{EB}<\overline{AE}$) and the length, $\overline{ED}$, of the sub-segment ED is less than the length, $\overline{CE}$, of the sub-segment CE and higher than 0 ($0<\overline{ED}<\overline{CE}$).

According to the invention, there is no contact between the second and/or third decoated element 34, 36 and the first decoated element 31 represented, but not limited to, by a square unit cell of the first decoated element allowing to avoid a direct coupling between the first decoated element and second decoated elements.

According to the invention and as shown in FIG. 3, in some embodiments, the length of sub-segments AE and EC of second decoated element is equals $n\lambda/2$ wherein n is a positive integer greater than 0. Lambda ($\lambda$) is the wavelength of the desire RF radiation at the interface with the glazing unit.

Surprisingly, lateral sub-segments of the second decoated element ED and EB improve the transmission of RF radiation thought the glazing unit by enlarging the bandwidth.

Figure 11:
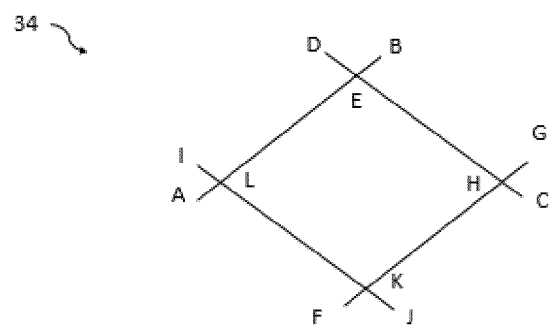

According to the invention and as shown in FIGS. 10 to 12, the second decoated element 32 comprises more than or equal to one additional segment, GF, IJ and/or MN, meaning that the second decoated element comprises at least three segments. Each segment has one interaction point with another segment meaning that two segments can have only one interaction point between these said two segments. Preferably, each segment has at most two intersection points meaning that a segment can intersect at most two different segments.

In some preferred embodiments, each segment has two interaction points with two different other segments to form a closed shape such as a polygon, for example a triangle with three segments, a rectangle, a square or a diamond with four segments, a pentagon with five segments, an honeycomb with six segments, or an polygon with different shape, lengths of segments and angles between segments.

In some embodiments, as shown in FIG. 11, the second decoated element 32 has a four segments, AB, CD, FG and IJ, forming a snake-like shape. In these embodiments, two segments have two intersections points, E and H and H and K. These two segments have a central segment, respectively EH and HJ, and two lateral sub-segments, respectively DE and HC and GH and KF. The two others segments have one intersection points, E and K. These two other segments have two lateral sub-segments, respectively AE and BE and JK and KI.

In some preferred embodiments, the length, $\overline{AE}$ and $\overline{KI}$, of longest sub-segment, AE and KI, of the two segments having only two lateral sub-segments added to the length, $\overline{EH}$ and $\overline{HK}$, of the two central sub-segments KE and EH and HK is equals $n\lambda/2$ wherein n is a positive integer greater than 0 ($\overline{AE}+\overline{EH}+\overline{HK}+\overline{KI}=n\lambda/2$). In case of more than four segments with a general snake-like shape, preferably, the length, of longest sub-segment of all segments having only two lateral sub-segments added to the length of all central sub-segments is equals $n\lambda/2$ wherein n is a positive integer greater than 0

Surprisingly, smallest lateral sub-segments (DE, BE, GH, CH, JK and FK) of segments of the second decoated element 32 improve the transmission of RF radiation thought the glazing unit by enlarging the passing band.

In some embodiments, as shown in FIG. 12, the second decoated element 32 has a four segments, AB, CD, FG and IJ, forming a quadrilateral. In these embodiments with four intersections points between segments, E H, K and L. These four segments have a central segment, respectively LE, EH and HK and KL, and two lateral sub-segments, respectively AL, IL, DE, EB, GH, CH, KJ and KF. According to the invention, the length of central sub-segments may be different such as angles formed between segments.

In some preferred embodiments, the length, $\overline{LE}$, $\overline{EH}$, $\overline{HK}$ and $\overline{KL}$, of all central sub-segments (LE, EH, HK and KL), forming a closed structure, of a second decoated element is equals n$\lambda$ wherein n is a positive integer greater than 0 ($\overline{LE}+\overline{EH}+\overline{HK}+\overline{KL}=n\lambda$).

Surprisingly, smallest lateral sub-segments (AL, IL, DE, EB, GH, CH, JK and FK) of segments of the second decoated element 32 improve the transmission of RF radiation thought the glazing unit by enlarging the passing band.

On top of that, enlarging the bandwidth allows to have a better reception of the signal inside if the glazing unit is used in a moving objet such as car, train, . . . due to Doppler effect and shifting of the frequency.

The invention allows to have several decoated portions with different dimensions of the first and second decoated elements on the glazing unit allowing to bring a wide range of frequencies transmitted through the glazing unit and avoiding any RF reflection on the glazing unit in the range of the used frequencies.

Figure 22:
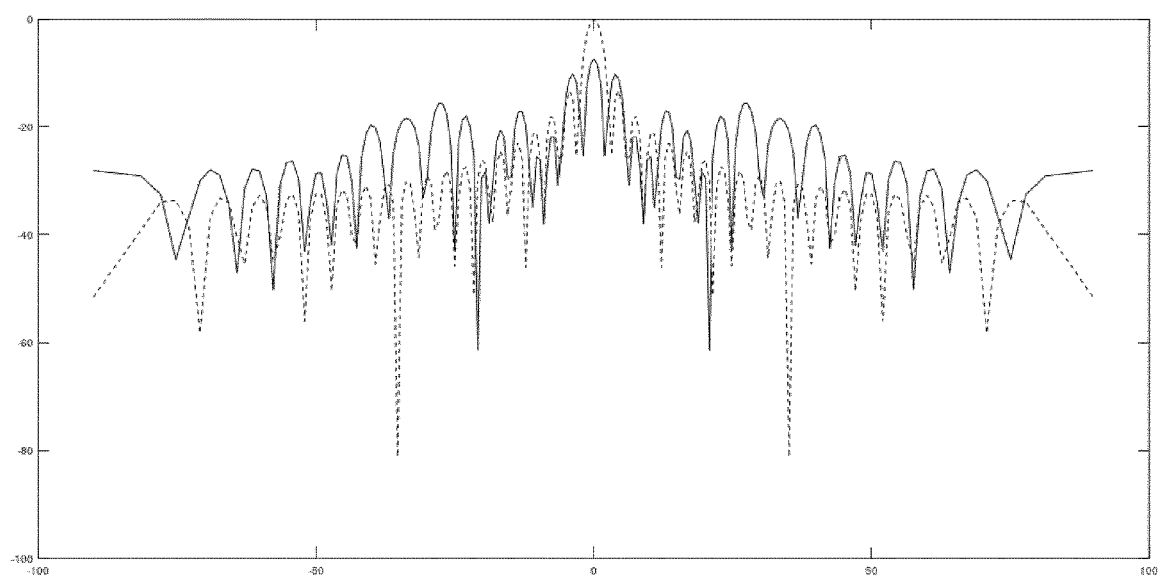
FIG. 22 shows a profile of decoating.

According to the invention FIG. 22 shows a diagram of db lost regarding the incidence angle. For a frequencies selective decoated portion having a grid of 4×4 mm with 51 columns (m=51) meaning around 20 cm width (DW=20.4 cm) and n rows. A single squared second decoated element as shown in FIG. 12 with segment of 1.2 mm is placed in unit cells with 1 and no second decoated element are placed in columns with 0 in the following manner: [1 1 1 1 1 0 0 1 1 1 0 0 1 1 1 0 0 0 0 0 0 0 0 0 0 0 0 0 0 0 0 0 1 1 0 0 1 1 1 0 0 1 1 1 1]. The peak is lower limiting health risks of over power while scattering the signal allowing to have a better signal inside.

The present invention relates also to a method for manufacturing a glazing unit according to the invention comprising steps of, as shown in FIGS. 13 to 16:

A. removing a part of the at least one frequencies selective decoated portion by laser ablation to form a first dimension of the first decoated element B. removing a part of the at least one frequencies selective decoated portion by laser ablation to form a second dimension of the first decoated C. In case of the first decoated element has more than two dimensions, repeat step B as many time as the first decoated element has dimensions D. removing a part of the at least one frequencies selective decoated portion by laser ablation the first segment of the plurality of second and/or third decoated elements in order to.

E. removing a part of the at least one frequencies selective decoated portion by laser ablation a second segment of the plurality of second and/or third decoated elements F. In case of a second and/or third decoated element has more than two segments, repeat step B as many time as the second and/or third decoated element has segments in addition to the first two segments.

According to the invention, dimensions of the first decoated element are different needed paths. In case of a unit cell of the first decoated element having a polygon shape, there are as many dimensions as sides of the polygon.

In some embodiments, unit cells of the first decoated element having a circular shape, steps A and B are merged and there is no step C because circle is considered as a single dimension.

In some embodiments of the invention, a laser 100 removes (ablates), with a laser beam 101, the at least one frequencies selective decoated portion by different steps, first set of steps (A, B and C) creates the first decoated elements and a second set of steps (D, E and F) creates the second decoated elements.

According to the invention and as shown in FIGS. 17 to 21, in some preferred embodiments where the glazing unit comprises at least one frequencies selective decoated portion comprising:

the unit cells of first decoated element are a regular squares with sides in X and Z axis to form a regular squared grid first decoated element, the plurality of second and/or third decoated elements comprises four segments with two segments substantially parallel to the X-axis and to one side of the first decoated element and two segments substantially perpendicular to the two other segments and four intersection points, wherein each section has three sub-segments, one central sub-segment and two lateral sub-segments, and each central sub-segment of each segment has substantially the same length than the other central sub-segments, comprising the steps of:

A. removing a portion of the coating by laser ablation to form a first line in the X-axis of the first decoated element, B. repeating the step A to provide all lines in the X-axis of the first decoated element.

C. removing a portion of the coating by laser ablation to form a first line in the Z-axis of the first decoated element, D. repeating the step C to provide all lines in the Z-axis of the first decoated element.

E. removing a portion of the coating by laser ablation to form a first discontinued line in the X-axis in order to create a first segment in the X-axis of the second decoated elements, F. removing a portion of the coating by laser ablation to form a second discontinued line in the X-axis adjacent to the first discontinued line in order to create a second segment in the X-axis of the second decoated elements, G. repeating the step E and F to provide all segments in the X-axis of second decoated elements.

H. removing a portion of the coating by laser ablation to form a first discontinued line in the Z-axis in order to create a first segment in the Z-axis of the second decoated elements, I. removing a portion of the coating by laser ablation to form a second discontinued line in the Z-axis adjacent to the first discontinued line in order to create a second segment in the Z-axis of the second decoated elements, J. repeating the step H and I to provide all segments in the Z-axis of second decoated elements.

To optimize paths of the laser but also energy and time consumption, all ablation steps in one of the X or Z axis can be made in consecutive steps and then all ablation steps in the other axis (respectively Z or X axis).

Preferably, to create segments of the second decoated elements, the laser is switch ON-OFF in a single path to create all aligned segments of different second decoated elements. Another way is to mask zones where the coating must be untouched.

FIG. 22 shows a profile of a decoating in the thickness of the coating system 20 with a surface 20A opposed to the surface of the coating system in contact with the glass sheet. The thickness of the decoating TC is deeper than the distance of the metallic layer(s) of the coating in order to create an isolated zone. The laser by working on ON/OFF function in order to create sides of second decoated elements creates a slope 20C. This slope allows the second decoated element to be more discreet for eyes. Preferably, intersection point(s) of the second decoated element are after the slope where the decoated is substantially parallel to the surface of the coating system in order to have an isolated structure as discreet as possible According to the present invention, the glazing unit may comprises several frequencies selective decoated portions on the coating with different sizes of first and second decoated elements in order to maximize the RF transparency of the glazing unit.

According to the present invention, the glazing unit may comprises several frequencies selective decoated portions with same characteristics on the coating in order to have a better spreading of the RF signal.

In some embodiments, at least one antenna can be placed in front of the frequencies selective decoated portion in order to let the at least one antenna radiates trough the glazing unit and/or received radiation from the other size of the glazing unit.

The glazing unit according to the invention is capable of increasing the transmission of waves with lower frequencies, below 6 GHz, and mmWave, above 15 GHz through the glazing unit with attenuation level for H or V polarization of at most −10 decibels (dB) while keeping the coating performances and minimizing the decoating percentage and the aesthetic between the coating and the decoating in order to keep the level of invisibility as high as possible.

The invention claimed is:

1. A glazing unit comprising:
   a glass panel which is low in reflectance for RF radiation;
   a coating system which is high in reflectance for RF radiation disposed on the said glass panel;
   at least one frequencies selective decoated portion of the coating system extending along a plane, P, defined by a longitudinal axis, X, and a vertical axis, Z; the decoated portion having a width, DW, measured along the longitudinal axis, X, and a length, DL, measured along the vertical axis, Z, comprising:
   a first decoated element comprising a plurality of unit cells forming a regular grid of n rows by m columns unit cells, $U_{m,n}$, wherein m and n are positive integers higher than 5 (n>5 and m>5) forming three zones, zone A from $U1,n$ to $U_{x,n}$, zone B from $U_{x+1,n}$ to $U_{y,n}$ and zone C from $U_{y+1,n}$ to $U_{m,n}$, wherein x and y are positive integers respectively higher than 1 and x (x>1 and y>x); and
   a plurality of second decoated elements,
   wherein at least one second decoated element is placed in a unit cell of the first decoated element,
   wherein no second decoated element is in contact with the first decoated element,
   wherein zone A and zone C each have more second decoated elements than zone B, and
   wherein at least 75% of the unit cells of zone B do not enclose any additional decoated element.

2. The glazing unit according to claim 1, wherein the at least one frequencies selective decoated portion comprises a plurality of third decoated elements having no contact with the first decoated element and the second decoated element.

3. The Glazing unit according to claim 2, wherein at least one of the plurality of third decoated elements is placed in an unit cell of the first decoated element without a second decoated element.

4. The glazing unit according to claim 1, wherein the at least one unit cell of the first decoated element having no second decoated element has no decoated element.

5. The glazing unit according to claim 1, wherein zone C represents 25% of the unit cells of the column.

6. The glazing unit according to claim 2, wherein the second and/or the third decoated elements comprise:
   a. a first segment AB wherein a point B is a free termination,
   b. a second segment CD wherein a point D is a free termination,
   c. an intersection point E between the first segment AB and the second segment CD forming sub-segments AE, EB, CE and ED, wherein a length, $\overline{EB}$, of the sub-segment EB is less than a length, $\overline{AE}$, of the sub-segment AE and higher than 0 (0<$\overline{EB}$<$\overline{AE}$), and wherein a length, $\overline{ED}$, of the sub-segment ED is less than a length, $\overline{CE}$, of the sub-segment CE and higher than 0 (0<$\overline{ED}$<$\overline{CE}$).

7. The glazing unit according to claim 6, wherein the second and/or the third decoated elements further comprise:
   more than or equal to one additional segment; and
   interactions points between segments,
   wherein each segment has one interaction point with another segment and wherein each segment has at most two intersection points, and each segment has two interaction points with two different other segments to form a closed shape.

8. The glazing unit according to claim 7, wherein the second and/or the third decoated elements comprise two additional segments:
   a third segment FG wherein a point F is a free termination and an intersection point H between the third segment FG and the second segment CD forming sub-segments FH, HG, CH, HE and ED, wherein a length, $\overline{HG}$, of the sub-segment HG is less than a length, $\overline{FH}$, of the sub-segment FH and higher than 0 (0<$\overline{HG}$<$\overline{FH}$); and
   a fourth segment IJ wherein a point I is a free termination and an intersection point K between the fourth segment IJ and the third segment FG forming sub-segments IK, KJ, FK, KH and HG wherein a length, $\overline{KJ}$, of the sub-segment KJ is less than a length, $\overline{IK}$, of the sub-segment IK and higher than 0 (0<$\overline{KJ}$<$\overline{IK}$) forming central sub-segments and lateral sub-segments.

9. The glazing unit according to claim 8, wherein the second and/or the third decoated element comprises a fourth segment IJ wherein the point I is a free termination, an intersection point K between the fourth segment IJ and the third segment FG forming sub-segments IK, KJ, FK, KH and HG wherein the length, $\overline{KJ}$, of the sub-segment KJ is less than the length, $\overline{IK}$, of the sub-segment IK and higher than 0 (0<$\overline{KJ}$<$\overline{IK}$) and an intersection point L between the fourth segment IJ and the first segment AB forming sub-segments AL, LE, EB, IL, LK and KJ wherein the length, $\overline{KJ}$, of the sub-segment KJ is less than a length, $\overline{KL}$ $\overline{LK}$, of the sub-segment K and higher than 0 (0<$\overline{KJ}$ <$\overline{LK}$).

10. The glazing unit according to claim 9, wherein a sum of the lengths of sub-segments between intersection points is equal to nλ wherein n is a positive integer greater than 0 ($\overline{LE}+\overline{EH}+\overline{HK}+\overline{KL}$=nλ) wherein n is a positive integer greater than 0.

11. The glazing unit according to claim 1, wherein each unit cell of the first decoated element is a regular square with sides in X and Z axis to form a regular squared grid decoated element.

12. The glazing unit according to claim 1, wherein zone C represents 35% of the unit cells of the column.

13. The glazing unit according to claim 1, wherein zone C represents 45% of the unit cells of the column.

14. A method for manufacturing a glazing unit according to claim 1 comprising:
   A. removing a part of the at least one frequencies selective decoated portion by laser ablation to form a first dimension of the first decoated element,
   B. removing a part of the at least one frequencies selective decoated portion by laser ablation to form a second dimension of the first decoated element,
   C. if the first decoated element has more than two dimensions, repeating B as many times as the first decoated element has dimensions,
   D. removing a part of the at least one frequencies selective decoated portion by laser ablation to form the first segment of the plurality of second and/or third decoated elements,
   E. removing a part of the at least one frequencies selective decoated portion by laser ablation to form a second segment of the plurality of second and/or third decoated elements, and
   F. if the second and/or third decoated element has more than two segments, repeating D and E as many times as the second and/or third decoated elements have segments in addition to the first two segments.

15. The method for manufacturing a glazing unit according to claim 14, wherein at least one frequencies selective decoated portion comprises:
   the unit cells of first decoated element being regular squares with sides in X and Z axis to form a regular squared grid first decoated element,
   the plurality of second decoated elements comprises four segments with two segments substantially parallel to the X-axis and to one side of the first decoated element and two segments substantially perpendicular to the two other segments and four intersection points, wherein each section has three sub-segments, one central sub-segment and two lateral sub-segments, and each central sub-segment of each segment has substantially a same length as the other central sub-segments, comprising:
   A. removing a portion of the coating by laser ablation to form a first line in the X-axis of the first decoated element,
   B. removing a portion of the coating by laser ablation to form a first discontinued line in the X-axis in order to create a first segment in the X-axis of the second decoated elements,
   C. removing a portion of the coating by laser ablation to form a second discontinued line in the X-axis adjacent to the first discontinued line in order to create a second segment in the X-axis of the second decoated elements,
   D. repeating A, B and C to provide all lines in the X-axis of the first and second decoated elements,
   E. removing a portion of the coating by laser ablation to form a first line in the Z-axis of the first decoated element,
   F. removing a portion of the coating by laser ablation to form a first discontinued line in the Z-axis in order to create a first segment in the Z-axis of the second decoated elements,
   G. removing a portion of the coating by laser ablation to form a second discontinued line in the Z-axis adjacent to the first discontinued line in order to create a second segment in the Z-axis of the second decoated elements, and
   H. repeating E, F and G to provide all lines in the Z-axis of the first and second decoated elements.

* * * * *